Patented Aug. 14, 1923.

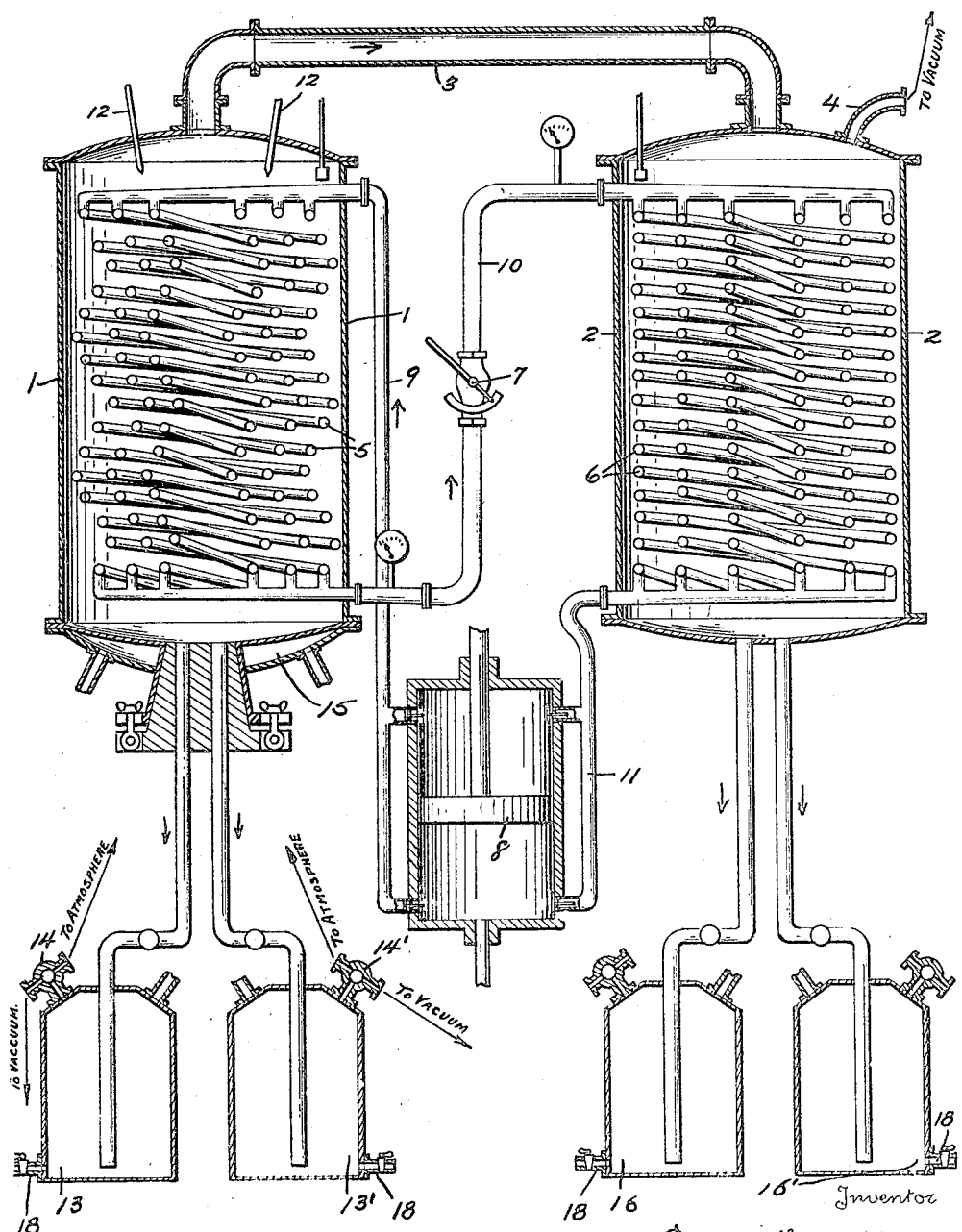

1,465,020

UNITED STATES PATENT OFFICE.

EUDO MONTI, OF TURIN, ITALY.

APPARATUS FOR CONCENTRATING SOLUTIONS.

Application filed November 19, 1919. Serial No. 339,204.

*To all whom it may concern:*

Be it known that I, EUDO MONTI, a subject of the King of Italy, residing at Turin, in the Kingdom of Italy, have invented certain new and useful Improvements in Apparatus for Concentrating Solutions; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object an apparatus for concentrating solutions and evaporating fluids (especially, flavoured extracts, alcohol, ethers, essences, perfumes and the like) at a low temperature, in which the heat-developed by the liquefaction of the compressed gas in the condenser of a condensing device analogous to a refrigerating machine, is utilized to evaporate the fluid under a low absolute pressure, and the absorption of heat caused by the evaporation of the condensed gas in the expansion coil of said machine is utilized to recondense the fluid.

The present invention is an improvement of the apparatus described and claimed in my U. S. Patents No. 973290 dated Oct. 18, 1910, No. 1,065,829 dated June 4th, 1913, and in my U. S. Patent applications No. 123563 filed Oct. 3rd, 1916, and Nos. 285906/285907 filed March 28th, 1919, characterized by the fact that the pipes of the condenser of a condensing machine are substituted for the bundle of lukewarm water tubes in my prior inventions aforesaid; also the condensing pipes of the condenser shown in my prior patents and applications are replaced in the present application by the pipes of the expansion coil of said condensing machine. Moreover the fluid to be evaporated or the solution to be concentrated is atomized by means of a sprayer and caused to fall on the surface of the comparatively hot pipes of the condenser, where most of the fluid is evaporated while the concentrated solution or the less volatile fluid (for instance the water contained in an alcoholic solution) are collected alternatively in two or more collectors in which the absolute pressure has been previously reduced by means of a pump to the same pressure existing in the evaporator. From said collectors the solution or fluid may of course if necessary be spread again on the pipes of the condensers till the desired effect is obtained. When the freezing point of the fluid to be evaporated (alcohol, ethers or essences) is low, the temperature of the condenser may be allowed to lower to a point approaching the freezing point of the condensing fluid, but should the fluid be water, the pressure of the compressed gas in the condensing machine must be controlled in order to avoid the formation of ice which would coat the pipes and hinder the absorption of heat.

This arrangement is particularly adapted to separate from grape juice, nonalcoholic beer or the like, the small percentage of alcohol they might eventually contain, without altering the flavor or the dietetic properties of the product; also to separate spirits, essences, or perfumes which would alter if heated at a temperature near their boiling point under atmospheric pressure; also for the distillation and concentration of solutions in general when fuel is scarce and costly or when little or no cooling water is available.

The annexed drawing shows diagrammatically and by way of example a constructional form of the apparatus forming the object of this invention. 1 indicates the evaporator and 2 the condenser which are connected above by means of the pipe 3. The condenser 2 communicates by means of the tubes 4 with a vacuum pump (not shown) of any known suitable type.

Inside the evaporator 1 is placed a coil 5 wherein is caused to circulate the gas arriving directly from the compressor of a condensing machine; inside the condenser 2 is placed a coil 6 wherein is caused to expand the gas flowing through a suitable reduction valve 7 from the coil 5 drawn by the compressor of the condensing machine directly from the coil 6.

Therefore, the apparatus 1 with its coil 5 constitutes respectively: the evaporator for the solution to be concentrated and the condenser for the compressed gas of the refrigerating machine.

The apparatus 2 with its coil 6 constitutes: the condenser for the vapor from the solution to be concentrated and the evaporator for the condensing machine.

8 shows diagrammatically the compressor of the condensing machine; 9, 10 and 11 show respectively the tubes establishing the communication between the compressor 8 and the coil 5, the coils 5 and 6, the coil 6 and compressor 8. The solution to be evaporated is finely sprayed by the atomizers 12 in the apparatus 1 on the coil 5, the alternated turns of which are so disposed as to fill up the apparatus 1 and to prevent the solution from dropping too rapidly on the bottom of the apparatus 1, which solution is on the contrary caused to fall gradually, moistening the whole surface of the coil tubes.

The more concentrated solution passes alternatively from the bottom of the apparatus 1 into one of the two containers 13 and 13' which are connected with the vacuum pump through three way cocks 14, 14' connecting the container with the above mentioned pump or with the atmosphere, while the other container (where the solution has previously been collected) is connected through a suitable pipe (not shown) with the sprayers 12, after atmospheric pressure has been reestablished therein by means of the cock 14 to 14', if a further concentration of the solution is required, or with the collecting apparatus (not shown).

The apparatus 1 can be provided with a double bottom 15 wherein lukewarm water may be caused to circulate whenever a further heating of the solution in the evaporator is required.

The condenser 2 may be provided at its bottom with a barometric tube (not shown) for the outlet of the condensed products, or with collecting apparatus 16, 16' similar to the containers 13, 13'.

Said containers are provided near the bottom with cocks 18 for the outlet of the already treated juices.

The apparatus may further be provided between the reduction valve 7 and the coil 6 with an automatic device (not shown) for controlling the pressure of the ammonia in the closed cycle constituted by the compressor 8, evaporator 5 and condenser 6.

In order to make better understood the description of the proceeding, I will describe its application to two typical cases, that is the dealcoholization of slightly fermented grape juice, malt extract, or the like, and the separation of alcoholic solutions of essences, having a different boiling point.

Very often grapes during their transportation from the vineyards to the factory, or while they are being stemmed and crushed, will ferment and though the fermentation be stopped by cooling, filtering or sterilizing said juice, the product often contains a more or less considerable percentage of alcohol which would make the product derived therefrom objectionable as a nonalcoholic drink. Also practise has proved that nonalcoholic beer would not have its characteristic taste if the malt extract has not initiated its fermentation, and its taste would alter if the separation of the alcohol thus formed were carried on at a high temperature or if the beer were to come into contact with steam heated surfaces. Grape juice is much more alterable than beer and will lose some of its original taste and flavour even if concentrated in a steam heated vacuum pan. The percentage of alcohol to be removed is generally small and ranges from 1 to 3% but in order to remove it under the atmospheric pressure the sugary juice should be warmed at from to 213 to 215° F. (101 to 102° C.) and at this temperature the albumin will curdle and separate and the enzyms and vitamines and all the ingredients which assist digestion will be so altered that the juice would lose its taste and dietetic properties, the albumin sticking to the steam heated pipes will curdle, coating said pipes and double bottoms, thus hindering the transmission of heat and communicating to the juice a very objectionable taste. I avoid such inconvenience by spreading the somewhat alcoholic juice previously atomized by means of a spreader on the heated coil 5 of the apparatus above described while the pump and the condenser maintain in said evaporator a pressure not exceeding 30 m/m Hg. Some of the water and all the alcohol will evaporate, condensing afterwards on the pipes of condenser 2 and dropping alternatively into reservoirs 16, and 16' while the dealcoholized juice, syrup or beer, is alternatively collected in reservoirs 13 and 13', from which it can easily be extracted without allowing any air to enter the evaporator by closing the cock 14 or 14' and opening cocks 18. Should the juice not be concentrated enough to keep, or should it still contain a little alcohol, I open the cock communicating with the evaporator 1 and with the reservoir 13' so that the concentrated juice drops into reservoir 13' while the somewhat concentrated juice contained in reservoir 13 will again feed the sprayers and, after having been furtherly concentrated and dealcoholized, will drop into reservoir 13'. The operation may be continued using reservoirs 13 and 13' alternatively, as feeders and collectors till the required concentration and complete dealcoholization is obtained. Should the concentration required exceed 75% in weight of dry extract a concentrator of the type described in my patent applications No. 285,906 and 285,907, filed March 28th, 1919, should be used to complete the dehydration of the syrup or extract.

The apparatus will also answer the purpose of separating essences, or any other liquid having different boiling points or whose vapours have different tension under a given temperature, and especially for the extraction and separation of essences or perfumes from their alcoholic solutions or the separation of ether from alcoholic solutions containing fat. In such cases the condensation of ammonia or other gas in the coils of the condenser 1 is used to heat the evaporator, and in the refrigerator 2, acting as a condenser of the distilling apparatus, the speed of the vacuum pump and the quantity of essence running through the atomizer should be regulated in such way as to obtain an increased temperature inside of the coil of the condenser and a lower temperature in the condensing pan. Moreover the absolute pressure in the distilling apparatus should be diminished accordingly. To make the proceeding better understood I will describe the case in which the apparatus is used for the treatment of a solution of scented grease in a mixture of two parts of alcohol and 1 of sulphuric ether which, under atmospheric pressure boil respectively at 78 C. and 35 C. while the mixture starts to boil at about 32° C. I first warm in a water bath the mixture contained in a covered pan to a temperature of about 25° C. if the outside temperature is lower, start the air pump and work it till the absolute pressure in the apparatus is lowered to about 200 m/m Hg., under which pressure the ether will evaporate at a temperature of 20° C. and condense at about 0° while the temperature of the ammonia in the condenser rises from 16 to 26°. I separate thus almost all the ether with a little alcohol, also some of the essence which will be collected in one of the collectors 16, 16' while the alcohol containing almost all the essence, the grease (whose melting point is of about 26° C.) and some water will collect in reservoirs 13 and 13' from which they will be passed again through the atomizer. The ether collecting in reservoir 16 and 16' contains a small percentage of alcohol and essence and will be used again to dissolve the scented grease in a further operation. I work then the vacuum pump and the regulator of the expansion of the gas in such a way that the pressure in the evaporator will descend to from 30 to 50 m/m Hg., while the temperature of ammonia in the condenser rises to about 36 and the alcohol with a little ether and almost all the essence will evaporate and collect in reservoir 16 and 16' while the melted fat and a little water with some alcohol will collect in collectors 13 and 13' which may, if necessary, be warmed by circulation of lukewarm water in order to completely melt the grease which contains still some alcohol and essence and will therefore be used to fix the scent extracted from other quantities of flowers.

Evidently petroleum ether which is cheaper than sulphuric ether may be used instead of the latter in order to dissolve the grease and be separated in the same way. The essences prepared following the proceeding above described are of a much better quality than the essences distilled as usual in a steam heated or even in a hot water heated vacuum pan refrigerated with spring water at about 15° C. under an absolute pressure of from 60 to 100 m/m Hg. The above described apparatus may be used for the rectification of spirits, especially brandy.

Essences, liquors and the like, obtained without use of steam do not contain furfurol, and it is a well known fact that brandy and liquors distilled in vacuum are of much better quality than the same product distilled under atmospheric pressure or even in a steam heated vacuum pan.

I claim:

Apparatus for concentrating fluids, comprising in combination an evaporating tank, a condensing tank communicating with the evaporating tank, a condensing machine including a compressor and having a coil in each of said tanks, the coil in the evaporating tank being adapted to receive the compressed heated medium from the compressor and the coil in the condensing tank constituting the expansion coil of the condensing machine, and means for producing a vacuum in the evaporating tank.

The foregoing specification signed at Turin, Italy, this sixteenth day of October, 1919.

EUDO MONTI.

In presence of two witnesses—
JOSEPH E. HAVEN,
HENRIETTA DIEFOMO.